(12) United States Patent
Chen

(10) Patent No.: US 9,190,895 B1
(45) Date of Patent: Nov. 17, 2015

(54) CIRCUIT FOR CONTROLLING LOAD SWITCH

(71) Applicant: FEELING TECHNOLOGY CORP., Hsinchu (TW)

(72) Inventor: Yi-Sheng Chen, Hsinchu (TW)

(73) Assignee: Feeling Technology Corp., Hsinchu (TW)

( * ) Notice: Subject to any disclaimer, the term of this patent is extended or adjusted under 35 U.S.C. 154(b) by 0 days.

(21) Appl. No.: 14/823,048

(22) Filed: Aug. 11, 2015

(30) Foreign Application Priority Data

May 1, 2015 (TW) .............................. 104114036 A

(51) Int. Cl.
*H05B 33/08* (2006.01)
*H02M 1/14* (2006.01)

(52) U.S. Cl.
CPC ............. *H02M 1/14* (2013.01); *H05B 33/0809* (2013.01)

(58) Field of Classification Search
None
See application file for complete search history.

(56) References Cited

U.S. PATENT DOCUMENTS

2007/0267978 A1* 11/2007 Shteynberg ........ H05B 33/0818
315/247

* cited by examiner

*Primary Examiner* — Douglas W Owens
*Assistant Examiner* — Dedei K Hammond
(74) *Attorney, Agent, or Firm* — Rosenberg, Klein & Lee

(57) ABSTRACT

A circuit for controlling load switch is disclosed in the present invention. The circuit is applied to a load circuit which includes a load switch and a working element. The circuit includes a first comparator, a second comparator, and a third comparator. When an inductance current achieves the average current, the first comparator triggered to conduct a first switch. When the inductance current achieves a default ripple current, the second comparator is triggered to conduct a second switch. When either one of the first switch and the second switch is conducted, the load switch is turned off to make a variable voltage be increased. When the first switch is conducted, a capacitance voltage of a controlled capacitance is increased to increase a turned-off time. When the second switch is conducted, the capacitance voltage is decreased to decrease the turned-off time to control the load switch.

4 Claims, 4 Drawing Sheets

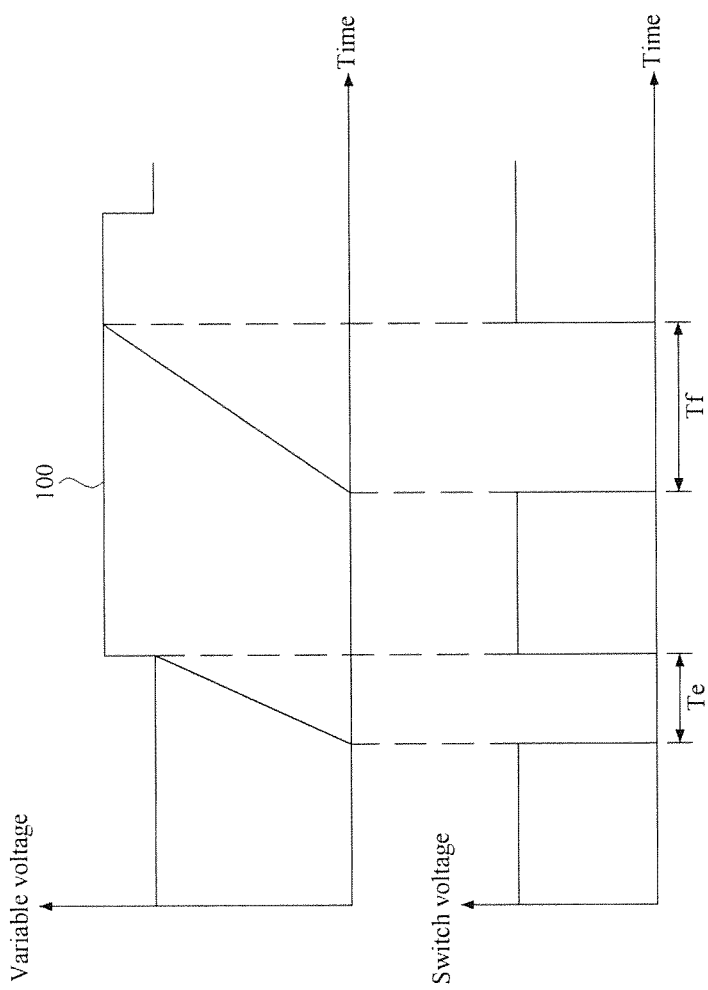

– 1 –

CIRCUIT FOR CONTROLLING LOAD SWITCH

This application claims the benefit of Taiwan Patent Application Serial No. 104114036, filed May 1, 2015, the subject matter of which is incorporated herein by reference.

BACKGROUND OF INVENTION

1. Field of the Invention

The present invention is related to a circuit for controlling load switch, and more particularly related to a circuit for controlling load switch by using three comparators and two switches to adjust the average current.

2. Description of the Prior Art

FIG. 1 is a circuit diagram showing a conventional integrated light emitted diode (LED) circuit. As shown, the conventional integrated LED circuit PA1 includes a load circuit PA11 and a driver circuit PA12. The load circuit PA11 is a LED circuit, and further includes a voltage source PA111, a full bridge rectifier circuit PA112, a resistor PA113, a diode PA114, a capacitor PA115, at least a LED PA116, an inductor PA117, a first switch PA118, a resistor PA119, a capacitor PA120, and a capacitor PA121.

The full bridge rectifier PA112 is coupled to the voltage source PA111 and coupled to the resistor PA113, the diode PA114, the capacitor PA115, and the LED PA116. The inductor PA117 has one end coupled to the diode PA114 and the drain of the first switch PA118 and another end coupled to the capacitor PA115 and the LED PA116. The resistor PA119 is coupled to the source of the first switch PA118 and also to CS pin of the driver circuit PA12. The capacitor PA120 is coupled to the resistor PA113 and also to VCC pin of the driver circuit PA12. The capacitor PA121 is coupled to COMP pin of the driver circuit PA12. The first switch PA118 is coupled to OUT pin of the driver circuit PA12.

As the first switch PA118 is conducted, an average circuit Ia is generated flowing through the LED PA116 and an inductor current Ib is generated flowing through the inductor PA117. In general, operation mode of the load circuit PA11 is decided by on time of the first switch PA118, which controls the increasing and decreasing of the inductor current Ib. The average of the peak value and the valley value of the inductor current Ib is the average current Ia. The above mentioned operation modes mainly include continuous conduction mode (CCM), discontinuous conduction mode (DCM), and boundary conduction mode (BCM), which are decided by the charging/discharging action of the inductor current Ib.

However, each of the operation modes has both advantage and disadvantage. Take the CCM mode for example, CCM mode has the advantage of small input and output ripple, small total harmonic distortion (THD) and Electra Magnetic Interference (EMI), and easier to executing filtering task, however, due to the restriction of circuit design of the load circuit PA11 in present, it is necessary to set the switching frequency or the switching time of the load switch under CCM mode. Once the setting is completed, as the inductance of the inductor PA117 has a significant change, a large ripple current would be generated even though the average current Ia is still stable. Thus, the LED with higher withstand current is needed such that the cost of the LED PA116 would be increased and thus the need to improve the technology in present exists.

SUMMARY OF THE INVENTION

In view of the restriction of the circuit design in present, it is a general problem of large ripple current due to the significant change of inductance which may increase the circuit cost. Accordingly, it is a main object of the present invention to provide a circuit for controlling load switch under CCM by using three comparators and two switches to control on and off of the load switch so as to such that the generation of ripple current can be controlled in responsive to different inductance values effectively and thus the above mentioned problem can be resolved.

In accordance with the above mentioned object, a circuit for controlling load switch is provided in the present invention. The circuit is applied to a load circuit. The load circuit includes a load inductor, a load switch, and at least a working element, wherein the load inductor is electrically connected to the load switch and the working element and generates an inductor current as the load switch is conducted. The circuit for controlling load switch is utilized for controlling the load switch under a continuous conduction mode (CCM) and comprises a first comparator, a second comparator, a first switch, a second switch, a first controlled capacitor, a third comparator, and a processing module. The first comparator has a first comparing input, a second comparing input, and a first comparing output. The first comparing input is electrically connected to the load inductor for receiving the inductor current. The second comparing input is utilized for receiving a default average current. The first comparing output transmits a first conduction signal as the inductor current reaches the default average current. The second comparator has a third comparing input, a fourth comparing input, and a second comparing output. The third comparing input is electrically connected to the load inductor for receiving the inductor current. The fourth comparing input is utilized for receiving a default ripple current, which is greater than the default average current. The second comparing output is utilized for transmitting a second conduction signal as the inductor current reaches the default ripple current. The first switch has a gate electrically connected to the first comparing output and a drain electrically connected to a first constant current source. The first switch is conducted when receiving the first conduction signal. The second switch has a gate electrically connected to the second comparing output, a source electrically connected to a second constant current source, and a drain electrically connected to a source of the first switch. The second switch is conducted when receiving the second conduction signal. The first controlled capacitor has one end electrically connected to the source of the first switch and the drain of the second switch and another end grounded to store a capacitor voltage. The third comparator has a fifth comparing input, a sixth comparing input, and a third comparing output. The fifth comparing input is utilized for receiving a variable voltage, which gradually increases as the load switch is turned off. The sixth comparing input is electrically connected to the source of the first switch and the drain of the second switch for receiving the capacitor voltage. The third comparing output transmits a re-conduction signal as the variable voltage reaches the capacitor voltage.

Wherein, as the first switch is conducted, the first constant current source charges the first controlled capacitor, and as the second switch is conducted, the second constant current source discharges the first controlled capacitor. As the load switch is conducted, the inductor current gradually increases, after the inductor current reaches the default ripple current, the second switch is conducted and the load switch is turned off by the processing module to trigger the variable voltage to increase, and as the variable voltage reaches the capacitor voltage, the processing module receives the re-conduction signal to re-conduct the load switch so as to adjust the off time of the load switch adequately.

In accordance with a preferred embodiment of the present invention, the processing module comprises a NOR gate, a first inverter, a SR latch, and a second inverter. The NOR gate has a first NOR input, a second NOR input, and a NOR output. The first NOR input is electrically connected to the first comparing output. The second NOR input is electrically connected to the second comparing output. The NOR output is utilized for transmitting an OFF signal as the first NOR input receives the first conduction signal or the second NOR input receives the second conduction signal. The first inverter is electrically connected to the third comparing output for inverting the re-conduction signal to generate an inverted re-conduction signal. The SR latch is electrically connected to the NOR output and the first inverter for transmitting a latch OFF signal after receiving the OFF signal and for transmitting a latch ON signal after receiving the inverted re-conduction signal. The second inverter is electrically connected to the SR latch and the load switch for inverting the latch OFF signal and the latch ON signal so as to generate and transmit an inverted latch OFF signal and an inverted latch ON signal respectively. The load switch is turned off when receiving the inverted latch OFF signal and the load switch is conducted when receiving the inverted latch ON signal.

In accordance with a preferred embodiment of the present invention, the circuit for controlling load switch further comprises a second controlled capacitor, a controlled switch, and a third constant current source. The second controlled capacitor is electrically connected to the fifth comparing input and has the variable voltage. The controlled switch is electrically connected to the fifth comparing input and is triggered to conduct as the load switch is conducted. The third constant current source is electrically connected to the second controlled capacitor for charging the second controlled capacitor to increase the variable voltage as the controlled switch is conducted. In addition, the load circuit is a light emitted diode (LED) circuit and the working element is an LED.

By using the circuit for controlling load switch provided in the present invention, off time of the load switch can be adequately controlled such that the frequency corresponding to the stabilized ripple current can be automatically adjusted to make sure that the circuit can be adopted to the circuit with different inductance. Thus, the cost of working elements can be reduced such that the problem of the conventional art can be effectively resolved.

By using the circuit for controlling load switch provided in the present invention, because the off time of the load switch can be adequately controlled, the problem of the conventional art can be effectively resolved.

BRIEF DESCRIPTION OF THE DRAWINGS

The present invention will now be specified with reference to its preferred embodiment illustrated in the drawings, in which:

FIG. 4 is a schematic diagram showing the waveforms corresponding to the variable voltage and the capacitor voltage in accordance with a preferred embodiment of the present invention.

DESCRIPTION OF THE PREFERRED EMBODIMENT

There are various embodiments of the circuit for controlling load switch in accordance with the present invention, which are not repeated hereby. Only one preferred embodiment is mentioned in the following paragraph as an example.

Figure 1:
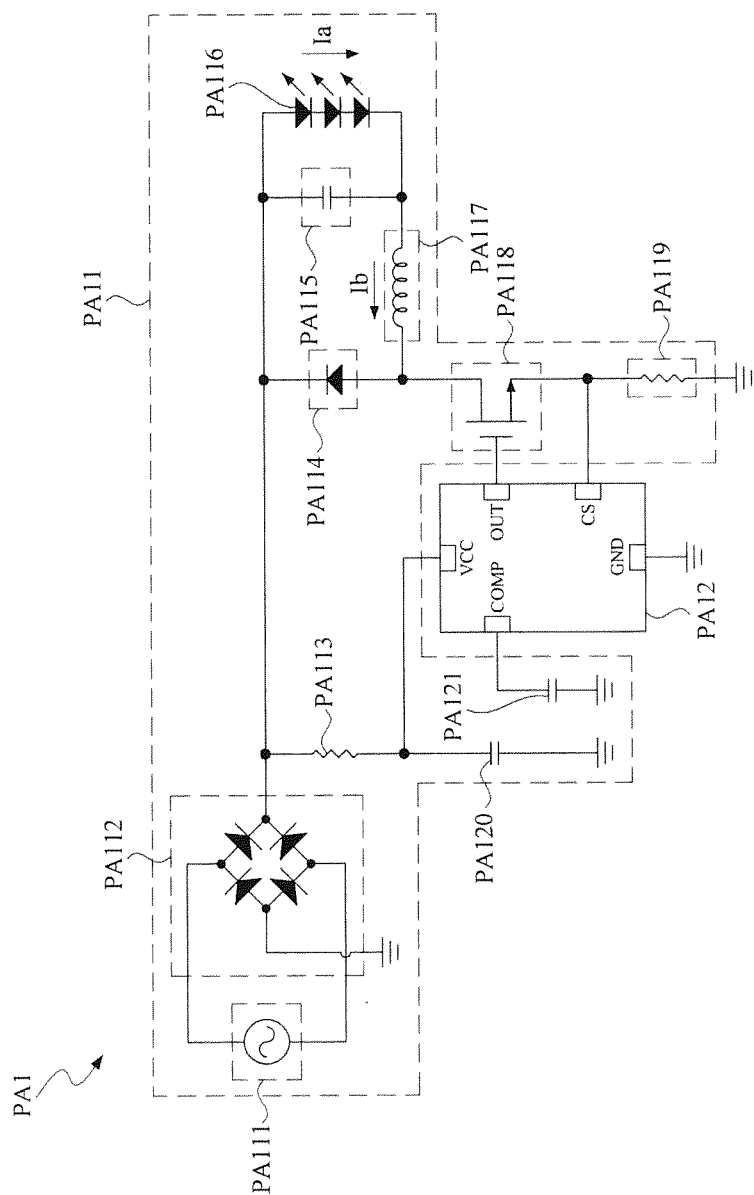
FIG. 1 is a circuit diagram of a conventional integrated light emitted diode (LED) circuit.
Figure 2:
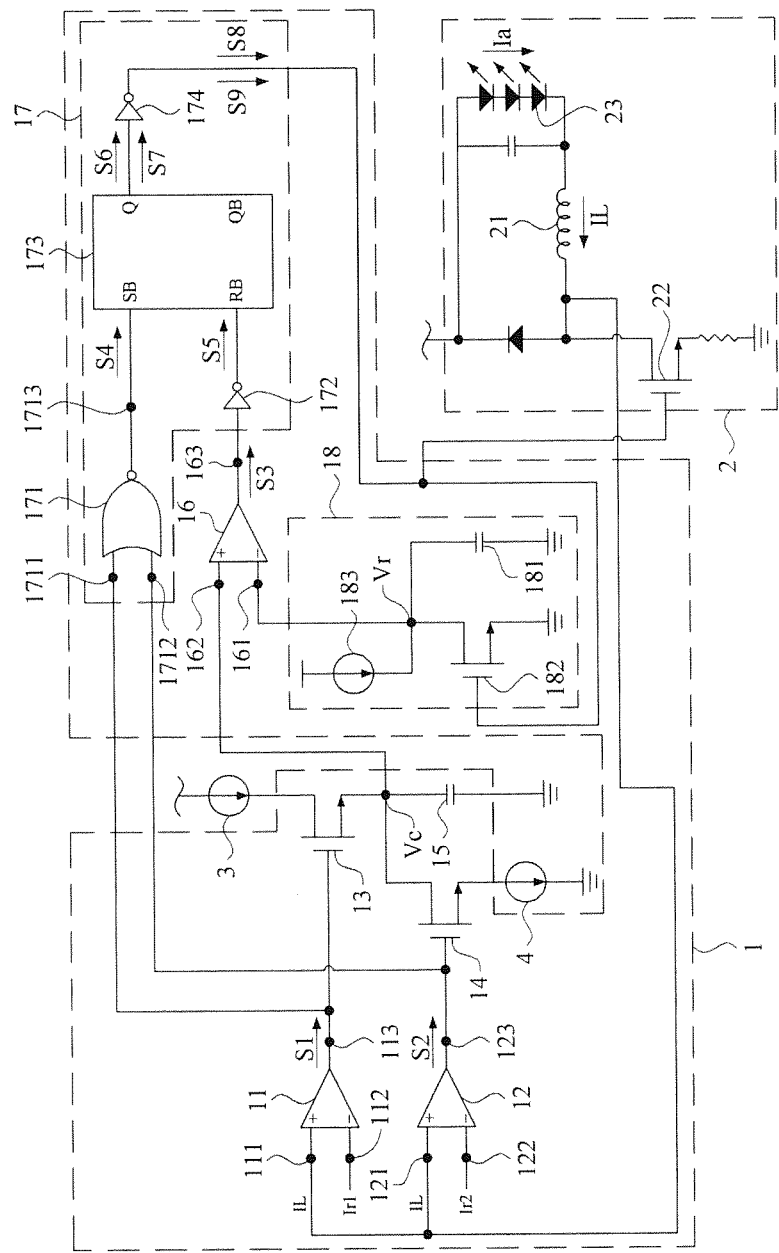
FIG. 2 is a circuit diagram of a circuit for controlling load switch in accordance with a preferred embodiment of the present invention.
Figure 3:
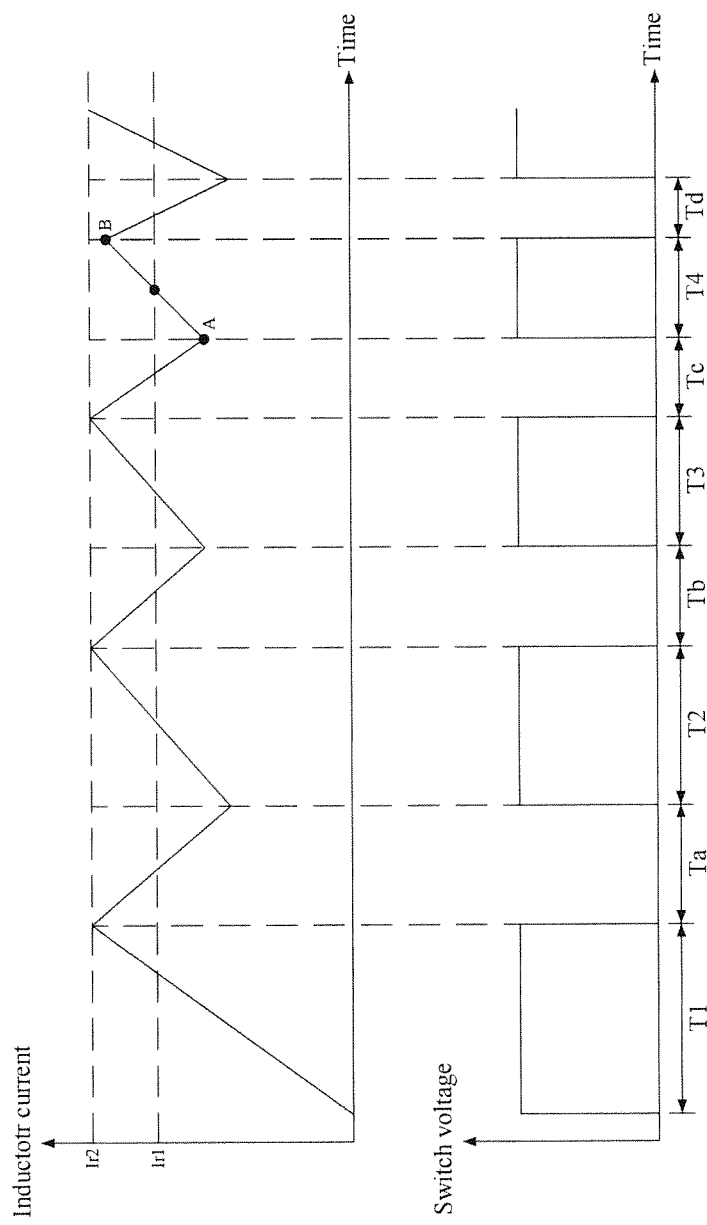
FIG. 3 is a schematic diagram showing the waveforms corresponding to the inductor current, the default average current, the default ripple current, and the load switch in accordance with a preferred embodiment of the present invention.

Please refer to FIGS. 2 and 3, wherein FIG. 2 is a circuit diagram of a circuit for controlling load switch in accordance with a preferred embodiment of the present invention and FIG. 3 is a schematic diagram showing the waveforms corresponding to the inductor current, the default average current, the default ripple current, and the load switch in accordance with a preferred embodiment of the present invention.

As shown, the circuit 1 for controlling load switch is applied to a load circuit 2. The load circuit 2 includes a load inductor 21, a load switch 22, and at least a working element 23 (only one of them is labelled). The load inductor 21 is electrically connected to the load switch 22 and the working element 23 and generates an inductor current IL as the load switch 22 is conducted. The circuit 1 for controlling load switch is utilized for controlling on/off time of the load switch 22 under a continuous conduction mode (CCM) so as to generate an adjusted average current Ia flowing through the working element 23 according to the inductor current IL. As a preferred embodiment, the load circuit 2 is an LED circuit, and the working element 23 is an LED. However, the present invention is not so restricted. In addition, the average current Ia is the average of the highest and lowest values of the inductor current IL. The load circuit 2 may also include the elements shown in the conventional art such as the voltage source, the full-bridge rectifier, the resistor, the diode, and the capacitor.

The circuit 1 for controlling load switch includes a first comparator 11, a second comparator 12, a first switch 13, a second switch 14, a first controlled capacitor 15, a third comparator 16, a processing module 17, and a voltage control module 18.

The first comparator 11 has a first comparing input 111, a second comparing input 112, and a first comparing output 113. The first comparing input 111 is electrically connected to the load inductor 21 for receiving the inductor current IL. The second comparing input 112 is utilized for receiving a default average current Ir1. Concretely speaking, the default average current Ir1 is a default value decided based on the circuit design in practice. As a preferred embodiment, the default average current Ir1 can be set as 10 mA.

The second comparator 12 has a third comparing input 121, a fourth comparing input 122, and a second comparing output 123. The third comparing input 121 is electrically connected to the load inductor 21 for receiving the inductor current IL. The fourth comparing input 122 is utilized for receiving a default ripple current Ir2. The default ripple current Ir2 is greater than the default average current Ir1. In general, the present ripple current Ir2 can be set as 20% greater than the default average current Ir1. For example, as the default average current Ir1 is 10 mA, the default ripple current Ir2 in accordance with a preferred embodiment would be 12 mA.

The first switch 13 has a gate electrically connected to the first comparing output 113 and a drain electrically connected to a first constant current source 3. The second switch 14 has a gate electrically connected to the second comparing output 123, a source electrically connected to a second constant current source 4, and a drain electrically connected to a source of the first switch 13.

The first controlled capacitor 15 has one end electrically connected to the source of the first switch 13 and the drain of the second switch 14 and has another end grounded for storing a capacitor voltage Vc.

The third comparator 16 has a fifth comparing input 161, a sixth comparing input 162, and a third comparing output 163. The fifth comparing input 161 is utilized for receiving a variable voltage Vr. The sixth comparing input 162 is electrically connected to the source of the first switch 13 and the drain of the second switch 14 for receiving the capacitor voltage Vc.

The processing module 17 is electrically connected to the first comparing output 113 and the second comparing output 123. Concretely speaking, the processing module 17 includes a NOR gate 171, a first inverter 172, a SR latch 173, and a second inverter 174.

The NOR gate 171 has a first NOR input 1711, a second NOR input 1712, and a NOR output 1713. The first NOR input 1711 is electrically connected to the first comparing output 113 and the second NOR input 1712 is electrically connected to the second comparing output 123.

The first inverter 172 is electrically connected to the third comparing output 163. The SR latch 173 is electrically connected to the NOR output 1713 and the first inverter 172. Concretely speaking, the SR latch 173 has a SB pin electrically connected to the NOR gate, a RB pin electrically connected to the first inverter 172. The second inverter 174 is electrically connected to the SR latch 173 and the load switch 22.

The voltage control module 18 includes a second controlled capacitor 181, a controlled switch 182, and a third constant current source 183. The second controlled capacitor 181 is electrically connected to the fifth comparing input 161 and has the variable voltage Vr. That is, the variable voltage Vr is the capacitor voltage of the second controlled capacitor 181. The controlled switch 182 is electrically connected to the fifth comparing input 161. Concretely speaking, the gate of the controlled switch 182 is also electrically connected to the second inverter 174, and the third constant current source 183 is electrically connected to the second controlled capacitor 181.

The first comparing output 113 transmits a first conduction signal S1 (such as [1] of the digital signal) as the inductor current IL reaches the default average current Ir1. The second comparing output 123 transmits a second conduction signal S2 (such as [1] of the digital signal) as the inductor current IL reaches the default ripple current Ir2. The first switch 13 is conducted when receiving the first conduction signal S1, and the second switch 14 is conducted when receiving the second conduction signal S2. The variable voltage Vr received by the fifth comparing input 161 gradually increases as the load switch 22 is turned off, and the third comparing output 163 transmits a re-conduction signal S3 as the variable voltage Vr reaches the capacitor voltage Vc.

The NOR input 1713 transmits an OFF signal S4 as the first NOR input 1711 receives the first conduction signal S1 or the second NOR input 1712 receives the second conduction signal S21. The first inverter 172 is utilized for inverting the re-conduction signal S3 to generate and transmit an inverted re-conduction signal S5. The SR latch 173 is utilized for transmitting a latch OFF signal S6 when receiving the OFF signal S4 and transmits a latch ON signal S7 when receiving the inverted re-conduction signal S5. The second inverter 174 is utilized for inverting the latch OFF signal S6 and the latch ON signal S7 to generate an inverted latch OFF signal S8 and an inverted latch ON signal S9 respectively, such that the load switch 22 would be turned off when receiving the inverted latch OFF signal S8 but would be conducted when receiving the inverted latch ON signal S9.

The inverted latch ON signal S9 would be also received by the controlled switch 182 such that the controlled switch 182 would be turned on as the load switch 22 is conducted. The third constant current source 183 charges the second controlled capacitor 181 as the controlled switch 182 is conducted to enhance the variable voltage Vr.

Please refer to FIGS. 2 to 4, wherein FIG. 4 is a schematic diagram showing the waveforms corresponding to the variable voltage and the capacitor voltage in accordance with a preferred embodiment of the present invention. As shown, in the beginning, the load switch 22 is triggered to be conducted to enter the time zone T1. Then, the inductor current IL gradually increases. As the inductor current IL reaches the default ripple current Ir2, the second comparing output 123 is triggered to transmit the second conduction signals S2 to conduct the second switch 14. Meanwhile, the NOR output 1713 is triggered to transmit the OFF signal S4 such that the inverted latch OFF signal S8 would be generated to turn off the load switch 22 and the time zone Ta begins. At this time, the third constant current source 183 charges the second controlled capacitor 181 to enhance the variable voltage Vr gradually. As the variable voltage Vr reaches the capacitor voltage Vc (such as the time zone Te of FIG. 4, which is merely for demonstration rather than being corresponding to time zones Ta, Tb, Tc, and Td), the third comparing output 163 transmits the re-conduction signal S3 such that the load switch 22 would be conducted again after receiving the inverted latch ON signal S8 and the time zone T2 begins. The following time zone T3 is similar to time zone T1, the following time zones Tb, Tc, and Td are similar to time zone Ta, and thus are not repeated here.

It is noted that the default average current Ir1 of the preferred embodiment of the present invention is the average of the highest value and the lowest value of the inductor current IL. Take the time zone T1 as an example, as the default average current Ir1 is 10 mA, the inductor current IL increases from 0 mA should be enhanced to 20 mA to have the average current reaches the default average current Ir1. However, the load switch 22 would be turned off as the inductor current IL reaches the default ripple current Ir2 to gradually reduce the inductor current IL such that the default average current Ir1 cannot be achieved.

In addition, as the inductor current IL gradually increases and reaches the default ripple current Ir2 to conduct the second switch 14, the second constant current source 4 would discharge the first controlled capacitor 15 to reduce the capacitor voltage Vc (as shown in FIG. 4, the waveform 100 indicates the capacitor voltage Vc which decreases after time zone Tf such that the off time of the load switch 22 becomes shorter than the previous time zone).

It is also noted that, in time zone T4, the inductor current IL is enhanced from point A to point B, and the default average current Ir1 is the average value of the current at point A and the current at point B. Then, the first comparing output 113 is triggered to transmit the first conduction signal S1 to conduct the first switch 13 so as to have the first constant current source 3 charges the first controlled capacitor 15 to enhance the capacitor voltage Vc (as shown in FIG. 4, the waveform 100 indicates that the capacitor voltage Vc, which is enhanced after time zone Te such that the needed charging time becomes longer and thus the off time of the load switch 22 becomes longer than the previous time zone, i.e. time zone Tf>time zone Te).

In addition, the NOR output 1713 transmits the OFF signal S4 after the first NOR input 1711 receives the first conduction signal S1 such that the inverted latch OFF signal S8 would be generated to turn off the load switch 22. The other portions of the time zone are similar to the time zone T1 and thus are not repeated here.

In addition, as shown in FIG. 3, in which time zone T4 is shorter than time zone T3, time zone T3 is shorter than time zone T2, and time zone T2 is shorter than time zone T1, the spirit of the present invention is that after the load switch 22 is conducted, the system may decide which condition (the inductor current IL reaches the default average current Ir1 or reaches the default ripple current Ir2) should be used to turn off the load switch 22 for adjusting the off time of the load switch 22. That is, the system can adjust the off time of the load switch 22 automatically. For example, as shown in FIGS. 3 and 4, in which time zone Ta is shorter than time zone Tb, time zone Tb is shorter than time zone Tc, time zone Tc is shorter than time zone Td, but time zone Te is greater than time zone Td and time zone Tf is greater than time zone Te, off time of the load switch 22 can be automatically adjusted so as to access the adequate off time to generate the adjusted average current Ia to stabilize the output of the working element 23.

In accordance with the present invention, the width of the above mentioned time zones is adjusted by using the charging/discharging operation of the first controlled capacitor 15. For a greater capacitor voltage Vc, the time needed for enhancing the variable voltage Vr to reach the capacitor voltage Vc would be longer such that the off time of the load switch 22 becomes longer. On the other hand, for a smaller capacitor voltage Vc, the time needed for enhancing the variable voltage Vr to reach the capacitor voltage Vc would be shorter such that the off time of the load switch 22 would be shorter (as shown in FIG. 4, the time zone Te is smaller than the time zone Tf). Thereby, the width of the time zones can be adjusted.

In conclusion, by using the circuit for controlling load switch provided in the present invention, off time of the load switch can be adequately controlled such that the ripple current can be steadily controlled to make sure that the present invention can be adopted to the circuit with different inductance. Thus, the cost of the working element can be reduced and the ripple current can be steadily controlled such that the problem of the conventional art can be effectively resolved.

The detail description of the aforementioned preferred embodiments is for clarifying the feature and the spirit of the present invention. The present invention should not be limited by any of the exemplary embodiments described herein, but should be defined only in accordance with the following claims and their equivalents. Specifically, those skilled in the art should appreciate that they can readily use the disclosed conception and specific embodiments as a basis for designing or modifying other structures for carrying out the same purposes of the present invention without departing from the scope of the invention as defined by the appended claims.

What is claimed is:

1. A circuit for controlling load switch, applied to a load circuit, which includes a load inductor, a load switch, and at least a working element, wherein the load inductor is electrically connected to the load switch and the working element and generates an inductor current as the load switch is conducted, the circuit for controlling load switch being utilized for controlling the load switch under a continuous conduction mode (CCM) and comprising:

a first comparator, having a first comparing input, a second comparing input, and a first comparing output, the first comparing input being electrically connected to the load inductor for receiving the inductor current, the second comparing input being utilized for receiving a default average current, and the first comparing output transmitting a first conduction signal as the inductor current reaches the default average current;

a second comparator, having a third comparing input, a fourth comparing input, and a second comparing output, the third comparing input being electrically connected to the load inductor for receiving the inductor current, the fourth comparing input being utilized for receiving a default ripple current, which is greater than the default average current, and the second comparing output being utilized for transmitting a second conduction signal as the inductor current reaches the default ripple current;

a first switch, having a gate electrically connected to the first comparing output and a drain electrically connected to a first constant current source, and being conducted when receiving the first conduction signal;

a second switch, having a gate electrically connected to the second comparing output, a source electrically connected to a second constant current source, and a drain electrically connected to a source of the first switch, and being conducted when receiving the second conduction signal;

a first controlled capacitor, having one end electrically connected to the source of the first switch and the drain of the second switch and another end grounded to store a capacitor voltage;

a third comparator, having a fifth comparing input, a sixth comparing input, and a third comparing output, the fifth comparing input being utilized for receiving a variable voltage, which gradually increases as the load switch is turned off, the sixth comparing input being electrically connected to the source of the first switch and the drain of the second switch for receiving the capacitor voltage, and the third comparing output transmitting a re-conduction signal as the variable voltage reaches the capacitor voltage; and a processing module, electrically connected to the first comparing output and the second comparing output, for turning off the load switch when receiving either the first conduction signal or the second conduction signal, and for conducting the load switch when receiving the re-conduction signal;

wherein, as the first switch is conducted, the first constant current source charges the first controlled capacitor, as the second switch is conducted, the second constant current source discharges the first controlled capacitor; as the load switch is conducted, the inductor current gradually increases, and after the inductor current reaches the default ripple current, the second switch is conducted and the load switch is turned off by the processing module to trigger the variable voltage to increase; and as the variable voltage reaches the capacitor voltage, the processing module receives the re-conduction signal to re-conduct the load switch.

2. The circuit for controlling load switch of claim 1, wherein the processing module comprises:

a NOR gate, having a first NOR input, a second NOR input, and a NOR output, the first NOR input being electrically connected to the first comparing output, the second NOR input being electrically connected to the second comparing output, and the NOR output being utilized for transmitting an OFF signal as the first NOR input receives the first conduction signal or the second NOR input receives the second conduction signal;

a first inverter, electrically connected to the third comparing output for inverting the re-conduction signal to generate an inverted re-conduction signal;

a SR latch, electrically connected to the NOR output and the first inverter, for transmitting a latch OFF signal after receiving the OFF signal, and for transmitting a latch ON signal after receiving the inverted re-conduction signal; and a second inverter, electrically connected to the SR latch and the load switch, for inverting the latch OFF signal and the latch ON signal to generate and transmit an inverted latch OFF signal and an inverted latch ON signal respectively, wherein the load switch is turned off when receiving the inverted latch OFF signal and the load switch is conducted when receiving the inverted latch ON signal.

3. The circuit for controlling load switch of claim 1, further comprising:

a second controlled capacitor, electrically connected to the fifth comparing input and having the variable voltage;

a controlled switch, electrically connected to the fifth comparing input, and being triggered to conduct as the load switch is conducted; and a third constant current source, electrically connected to the second controlled capacitor, for charging the second controlled capacitor to increase the variable voltage as the controlled switch is conducted.

4. The circuit for controlling load switch of claim 1, wherein the load circuit is a light emitted diode (LED) circuit and the working element is an LED.

* * * * *